No. 670,230. Patented Mar. 19, 1901.
T. P. HARTSHORN.
BUCKLE MACHINE.
(Application filed Dec. 28, 1900.)
(No Model.) 7 Sheets—Sheet 1.
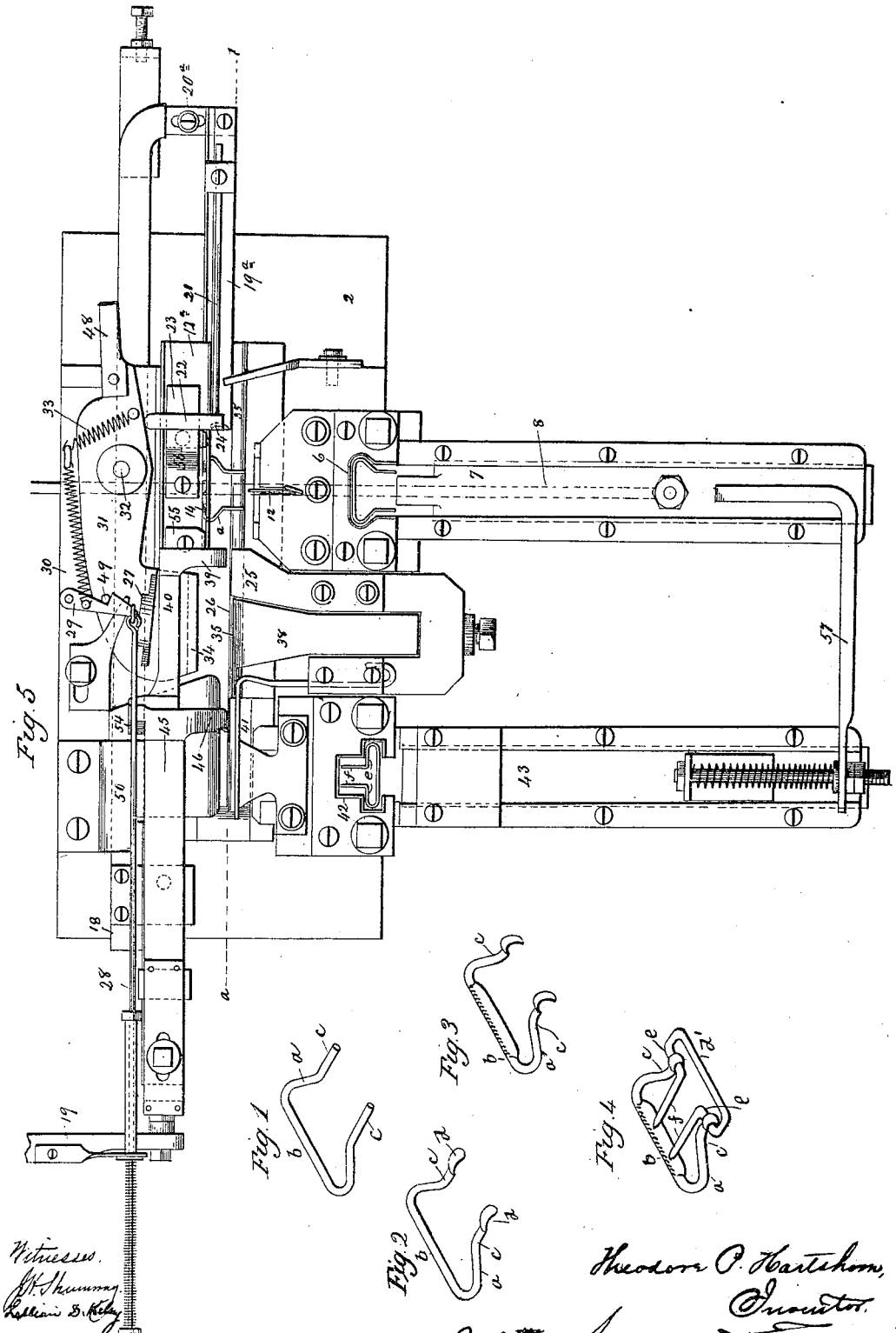

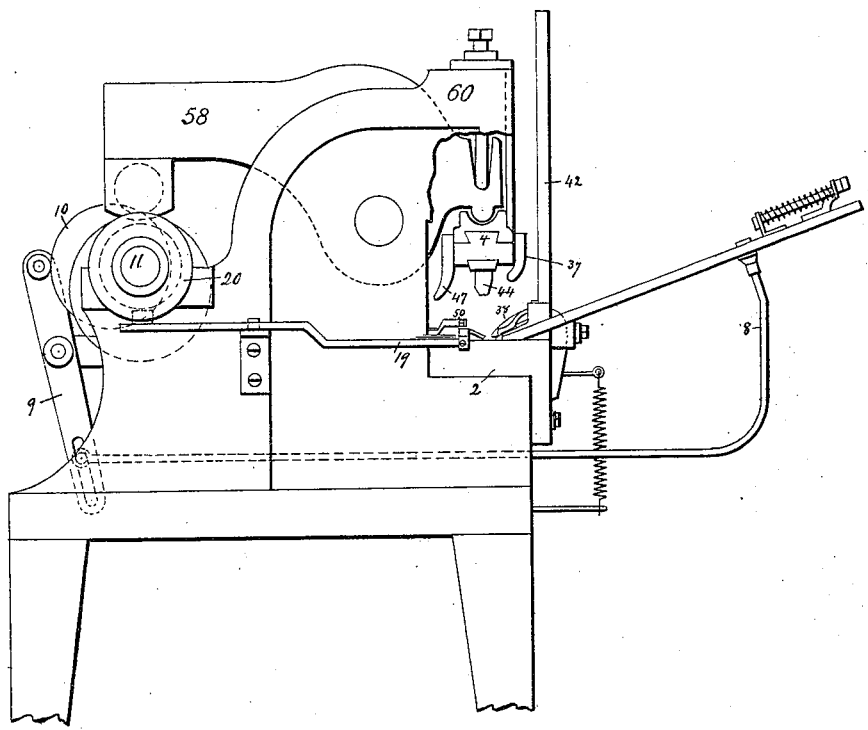

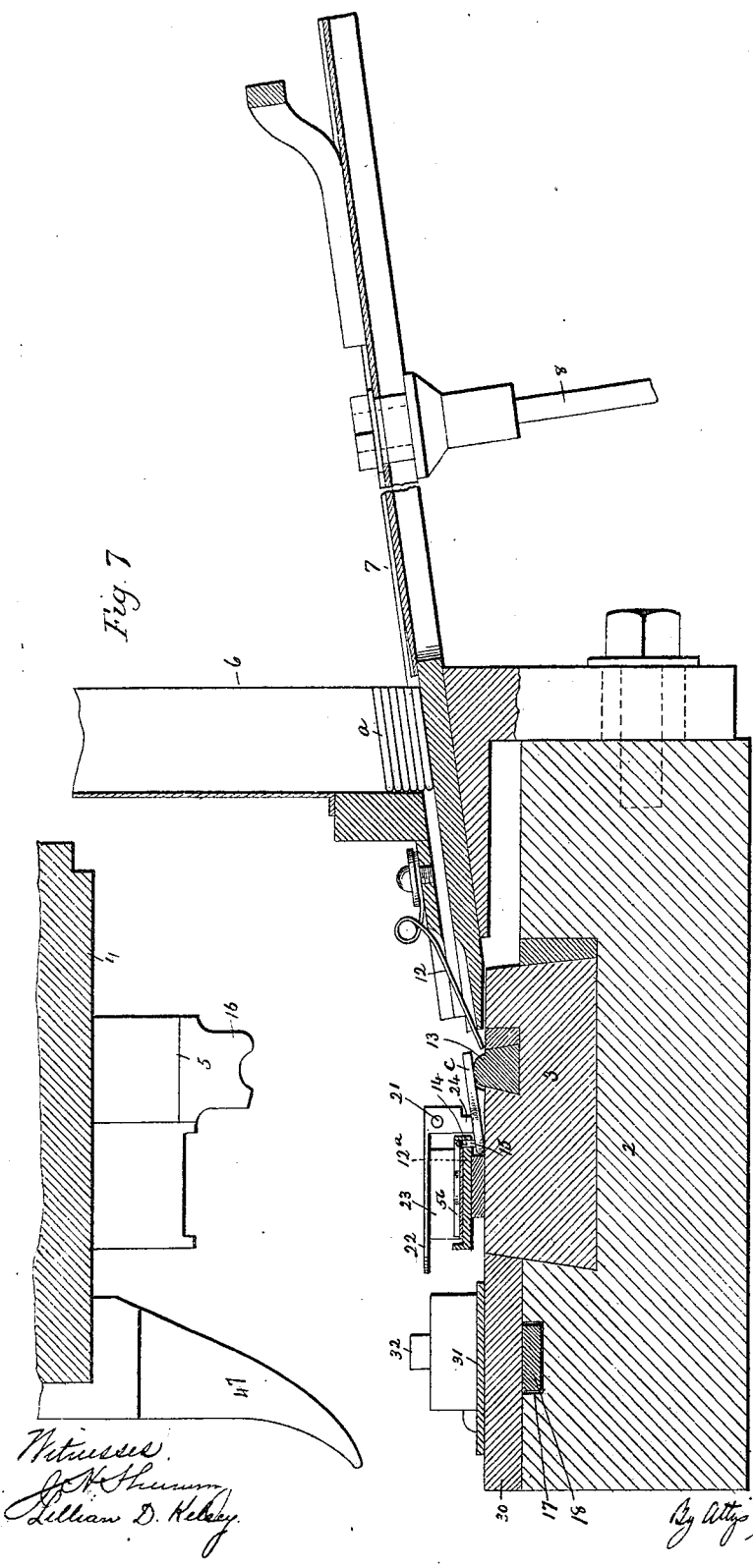

No. 670,230.　　　　　　　　　　　　　Patented Mar. 19, 1901.
T. P. HARTSHORN.
BUCKLE MACHINE.
(Application filed Dec. 28, 1900.)

(No Model.)　　　　　　　　　　　　　7 Sheets—Sheet 4.

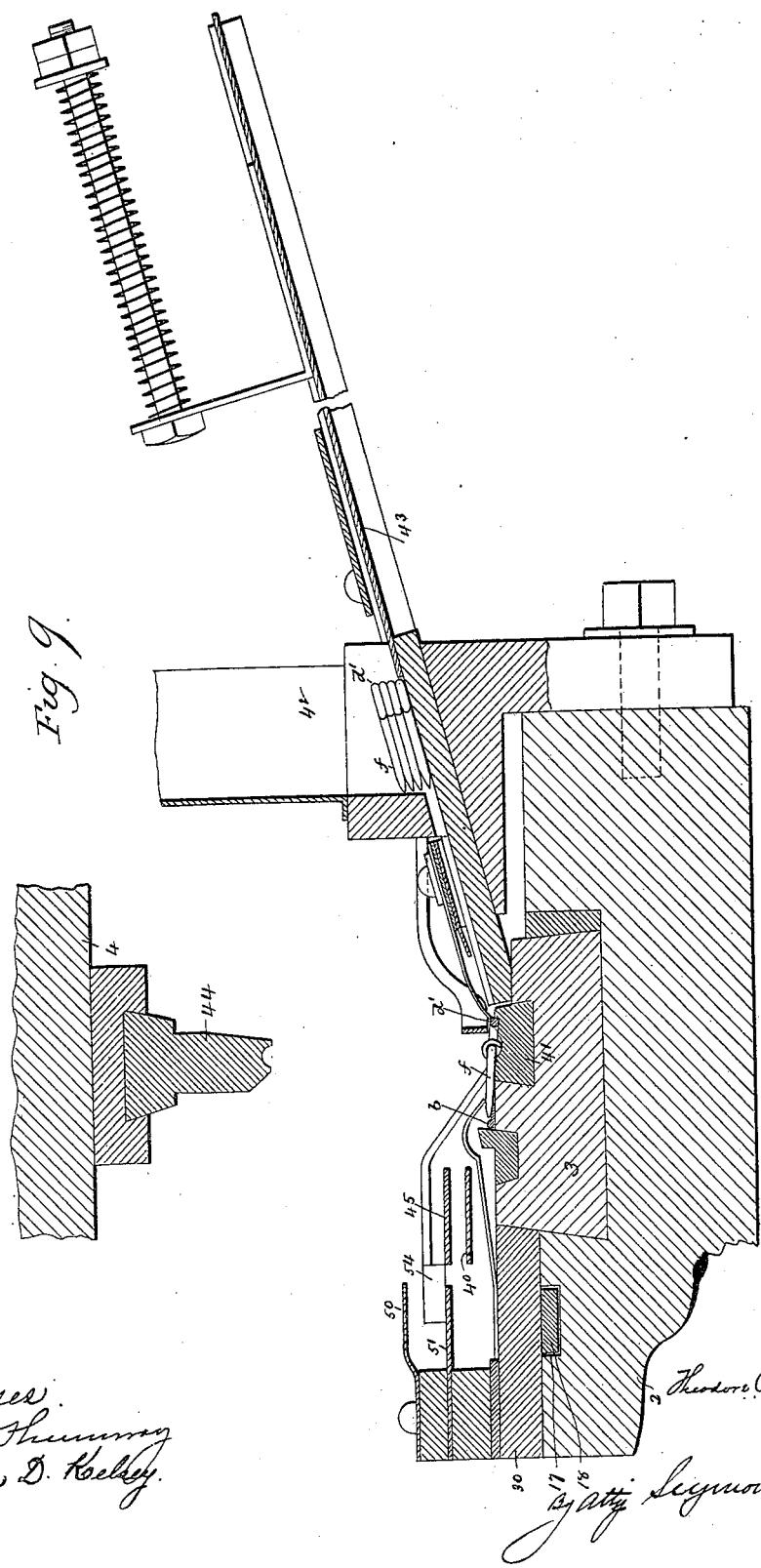

No. 670,230. Patented Mar. 19, 1901.
T. P. HARTSHORN.
BUCKLE MACHINE.
(Application filed Dec. 28, 1900.)
(No Model.) 7 Sheets—Sheet 6.
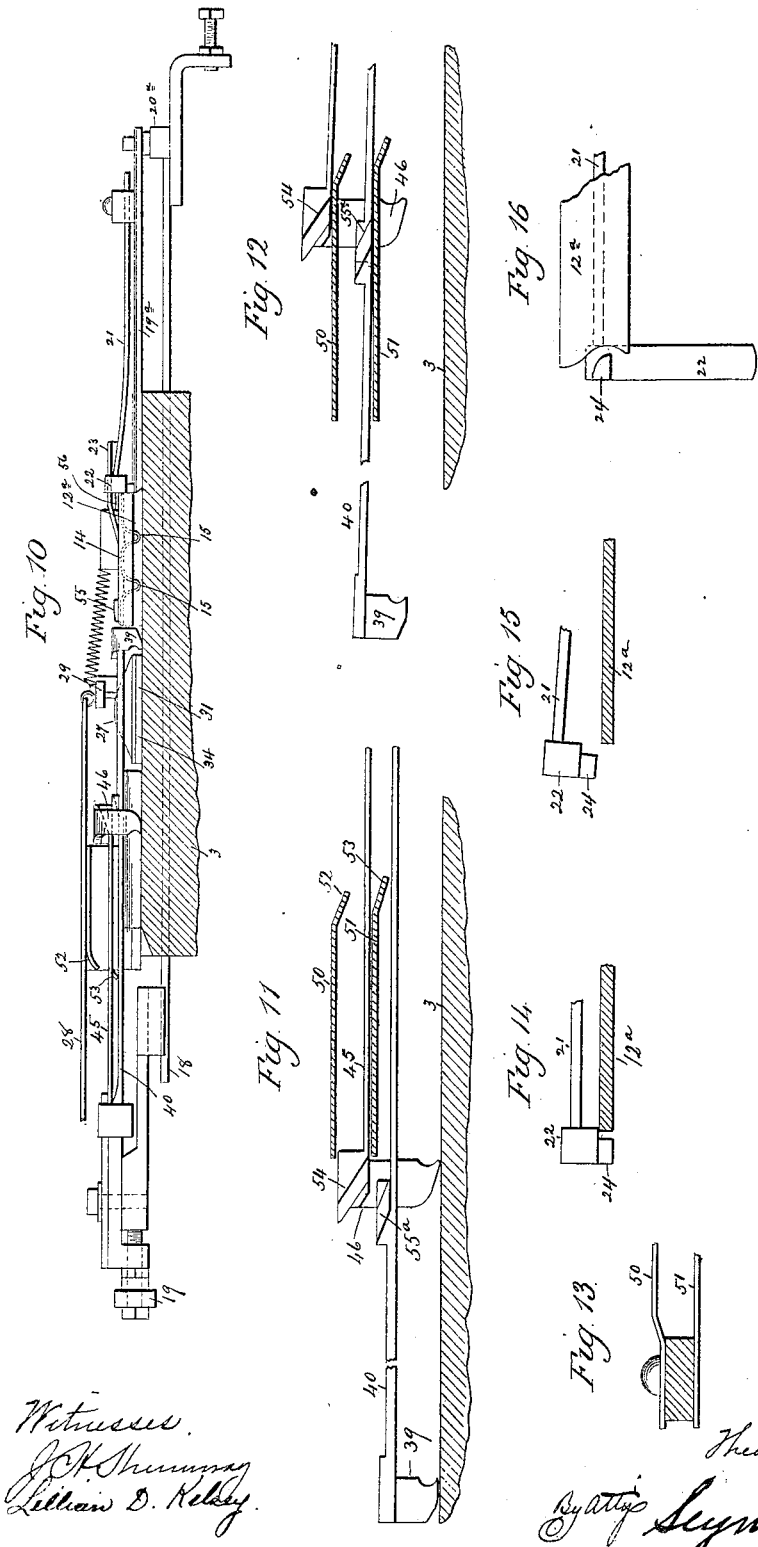

No. 670,230. Patented Mar. 19, 1901.
T. P. HARTSHORN.
BUCKLE MACHINE.
(Application filed Dec. 28, 1900.)
(No Model.) 7 Sheets—Sheet 7.

Witnesses.
Theodore P. Hartshorn.
Inventor.
By Attys

UNITED STATES PATENT OFFICE.

THEODORE P. HARTSHORN, OF WEST HAVEN, CONNECTICUT, ASSIGNOR TO THE AMERICAN BUCKLE CO., OF SAME PLACE.

BUCKLE-MACHINE.

SPECIFICATION forming part of Letters Patent No. 670,230, dated March 19, 1901.

Application filed December 28, 1900. Serial No. 41,432. (No model.)

*To all whom it may concern:*

Be it known that I, THEODORE P. HARTSHORN, of West Haven, in the county of New Haven and State of Connecticut, have invented a new Improvement in Buckle-Machines; and I do hereby declare the following, when taken in connection with the accompanying drawings and the characters of reference marked thereon, to be a full, clear, and exact description of the same, and which said drawings constitute part of this specification, and represent, in—

Figure 8:
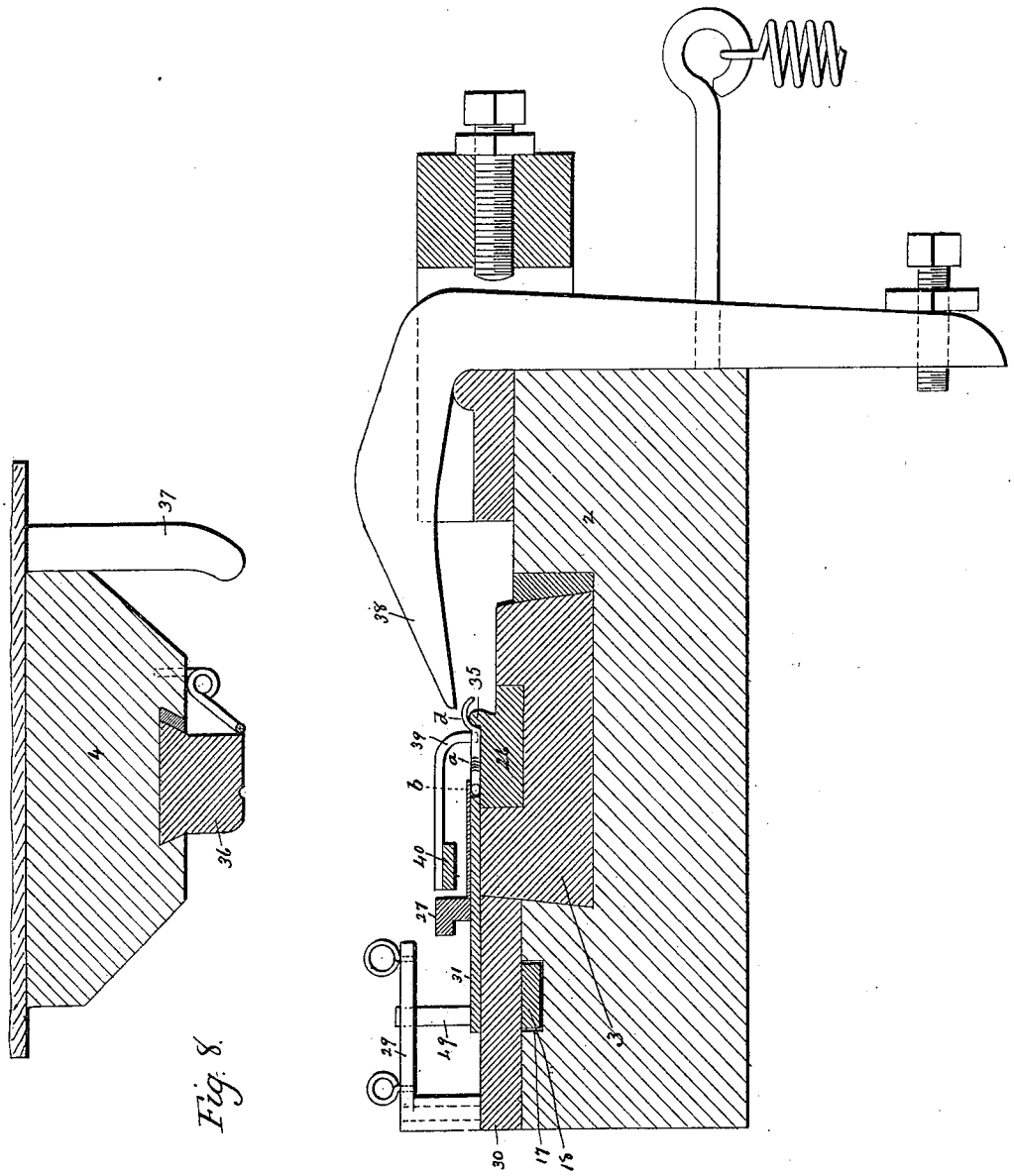
Figure 17:
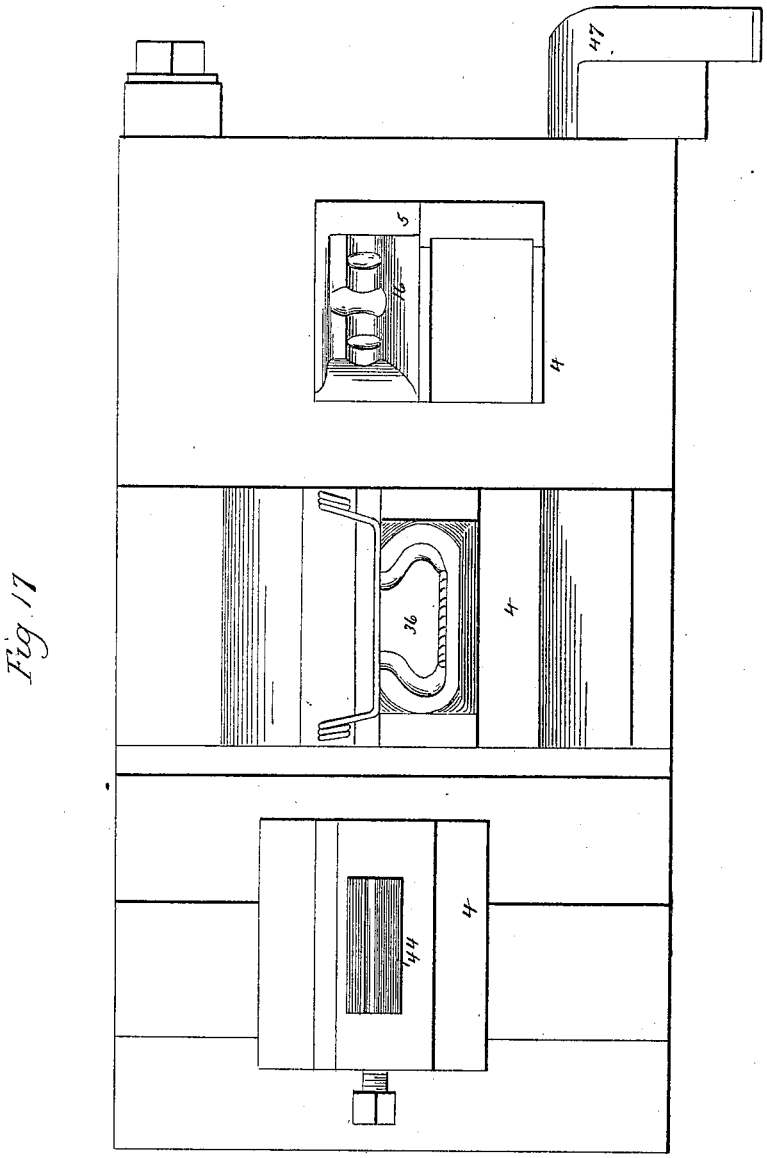

Figure 1, a perspective view of a blank for the body of a buckle as formed preparatory to operation by my machine; Fig. 2, a perspective view of the blank after the first operation by which the ends of the body are flattened; Fig. 3, a perspective view of the body after the second operation by which the bar is formed and the ends turned down; Fig. 4, a perspective view of a buckle complete as discharged after the third operation; Fig. 5, a top or plan view of the main portion of a machine constructed in accordance with my invention, the upper portion of the press removed; Fig. 6, an end view of the same partially broken away to illustrate means for operating the gate; Fig. 7, a broken sectional view illustrating the first operation; Fig. 8, a sectional view illustrating the second operation; Fig. 9, a sectional view illustrating the third operation; Fig. 10, a sectional view on the line $ab$ of Fig. 5; Fig. 11, a view, partially in section, illustrating the switch-plates and showing the transferring devices in their lower position; Fig. 12, a similar view illustrating the transferring devices as having been raised by the switch-plates; Fig. 13, a broken end view of the switch-plates; Fig. 14, an end view of the transferring device for moving the blank from the first to the second die with the finger in its lower position; Fig. 15, a similar view with the finger raised to release the blank; Fig. 16, an underside view of the same parts, showing the formation of the end of the plate and the transferring-finger; and Fig. 17, an underside view of the upper dies.

This invention relates to an improvement in machines for making wire buckles, and particularly that class of buckles which are formed from two pieces of wire, one, or the tongue member, having a loop and two prongs, and the other, or body member, forming a bar against which the outer ends of the tongues bear when the ends of the body are bent around the loop, whereby the parts are hinged together, such buckles being commonly known as "vest-buckles," but which obviously are adapted for and used in a variety of places. In the manufacture of this class of buckles it has been customary to cut and partially bend the wire for the members in independent machines, then form the bar of and partially bend the ends of the body member in another machine, and finally place the body and tongue together by hand and insert them into a press by which the ends of the body member are closed around the tongue.

The object of this invention is to produce a machine into which both parts of the buckle may be automatically fed from hoppers connected therewith and in which the body member will be suitably formed and automatically united with the tongue member and the completed buckle discharged from the machine; and it consists in the construction and arrangement of parts, as will be hereinafter described, and particularly recited in the claims.

In describing the invention the construction and arrangement of parts will be described in the order of their several operations.

In carrying out the invention I employ an ordinary drop-press, comprising a bed 2, having a lower die-block 3, in which three sets of dies are arranged, as will be described later on, and a gate or plunger 4, mounted for vertical movement in the head 60 and carrying the upper die-block 5, having three sets of dies to coöperate with the three dies in the lower block 3. The gate or plunger is coupled with the forward end of an arm 58, which is rocked by a cam 59 at the rear of the machine, as is usual in power-presses and for which mechanism any other style of power-press may be employed.

The body $a$ of the buckle is formed from a piece of wire bent into practically U shape, so as to form a bar $b$ and ends $c$, as shown in Fig. 1 of the drawings, and these members are cut and bent in the usual manner and fed into a hopper 6, which is suitably connected with or supported in front of the bed 2, and these blanks for the bodies a are forced from the bottom of the hopper 6 by a slide 7, which is operated by an arm 8, extending rearward into engagement with a lever 9, adapted to be operated by a cam 10 on the driving-shaft 11 at the rear of the machine. The blank thus removed from the bottom of the hopper by the slide 7 is carried rearward, beneath the spring 12, onto the lower die-block 3 and so that the bar b is forced beneath a plate 12ª and so that the ends c rest upon a first die or anvil 13, mounted in the die-block 3, as shown in Fig. 7. The blank is held in this position by means of a wire 14, the ends of which are secured to the top of the plate 12ª by disks 55 56 and having two downwardly-projecting U-shaped bends 15 15, which extend through clearance-openings formed in the plate and beneath which the bar b of the blank is forced, so as to stand in rear of the bends 15, as also shown in Fig. 7. When the blank is in this position, the gate 4, carrying the upper die 5, comes down and a former 16, having an under face corresponding to the anvil 13, strikes the ends c of the wire and flattens and slightly bows the extreme outer ends d, as shown in Fig. 2 of the drawings. In a groove 17, formed in the upper face of the bed 2 and in rear of the die, is a slide 18, which is longitudinally movable by means of a lever 19, extending rearward from the left-hand end to a cam 20 on the driving-shaft 11. At the right-hand side of the machine the slide 18 is connected with a long arm 19ª, arranged parallel therewith and adapted to ride on the upper face of the bed, upon which it is held by a steady-arm 20ª. The arm 19ª carries a spring-rod 21, provided at its free end with a transferring-finger 22. This finger 22 is normally held in a raised position by an inclined lifter 23, which is secured to the plate 12ª and upon which the finger rests; but when the slide 18 moves to the left the finger 22 rides down the incline 23 and the end 24 of the finger drops down inside the body-blank, which is thereby rigidly held between the finger and the end of the slide 18, which conforms to the curvature of the body, as clearly shown in Fig. 16. When thus gripped, the blank a is moved to the left under a guide 25 and over a die 26 in the die-block 3, and when carried to this position by the finger 22 the finger rides upon a cam-surface 27, mounted on a lever 31, which lifts the finger and releases the blank, which is held against movement to the right by the said guide 25. At this time the slide will have passed so far to the left as to cause a rod 28, which is carried thereby, to have tripped a latch 29, mounted on a block 30, secured to the bed of the machine, which serves to cover the slide 18, and this latch releases a lever 31, mounted on a pivot 32, which, under the action of a spring 33, will throw its forward end 34 against the bar of the blank over the anvil 26 and bring the ends thereof over a hump 35, formed at the forward edge of the anvil. When in this position, the downward movement of the gate 4, also carrying an upper die 36, flattens the bar b to form a bearing-plate for the ends of the tongue, as shown in Fig. 3. At the same time a projection 37 on the gate strikes the end of a bender 38, which turns the extreme ends of the frame downward over the hump 35, so as to give them a semicircular form. The operations thus far performed upon the blank correspond to the operations performed by a machine which was the subject of United States Patent No. 323,155, granted July 28, 1885, to George R. Kelsey.

To unite the blank thus formed with the tongue, the blank is moved by a finger 39, carried by arm 40, secured to the left-hand end of the slide 18, one step to the left and over an anvil 41, also mounted in the die-block 3. When thus located, the tongues d', which comprise a loop having inturned ends e and points or tongues f, are fed from a chute 42 by a slide 43, actuated by the same means as the slide 7, with which it is connected by an arm 57, in place beneath the bowed ends of the frame and with the points resting upon the bar b. The gate 4 also carries a third die 44, the end of which coacts with the anvil 41 to close the ends of the frame around the inturned ends e of the tongue and so as to unite the frame and tongue as shown in Fig. 4. Carried by the slide 18 is a third arm 45 above the arm 40 and provided with a depending finger 46, which under the action of the slide forces the finished buckle from the machine.

It will be understood that after the first blank is moved into position for the second operation a second blank is fed to the first die and that as the first and second blanks are moved into positions on the second and third dies a third blank is moved to the first die. The downward movement of the gate will at the proper time cause a finger 47 to coact with the tail 48 of the lever 31 to move it backward and so that the latch 29 will engage with a pin 49 thereon to lock the latch in the retired position and from which it is released, as before described, after the slide has moved a blank from the first operation into position for the second.

To permit the slide to return to its former position and ready to move the several blanks, the fingers 39 46 must be lifted to clear the parts just transferred. To accomplish this, I arrange two switch-plates 50 51 one above the other, each having a downwardly-turned end, respectively, 52 53, and the rear end of the finger 46 is formed with an incline 54, and the rod which carries the finger 39 is formed with a corresponding inclined lug 55ª, which on the return movement of the slide rides up over the ends 52 53 on the switch-plates 50 and 51, and so lifts the fingers 39 and 46, permitting them to ride over blanks which have just been fed to positions for the second and third operations.

It will thus be seen that in a single press and without additional power or care than were required to drive and tend prior machines for forming the body buckle-bodies are formed, united with their tongues, and discharged complete from the press.

Having fully described my invention, what I claim, and desire to secure by Letters Patent, is—

1. In a buckle-machine, the combination with a bed carrying three dies, of a gate carrying three upper dies corresponding in location thereto, chutes arranged adjacent to the end dies, and means for transferring blanks from the chutes to the dies, transferring devices for moving the blanks from one die to the next, and discharging the completed buckle from the machine, and means for elevating the transferring devices on their return movement, substantially as described.

2. In a buckle-machine, the combination with the bed thereof and three dies arranged thereon, a gate carrying three upper dies corresponding in location to the lower dies, chutes arranged adjacent to the end dies and adapted to feed blanks therefrom to the end dies, a slide movable transversely across the machine, said slide carrying transferring devices for moving the blanks from one die to the next, and discharging the finished buckles from the machine, a lever pivotally mounted on the bed, and adapted to move forward to locate the blank on the second die, substantially as described.

3. In a buckle-machine, the combination with the bed thereof having three dies arranged thereon, a gate carrying three upper dies corresponding in location to the lower dies, chutes adapted to deliver blanks to the end dies, a slide transversely movable across the machine, said slide carrying a plate arranged forward of the slide and parallel therewith, said plate carrying a transferring-arm, means for normally holding the arm above the plane of the blank on the first die, but adapted to permit the finger of the transferring-arm to drop inside the body of the buckle, whereby the blank is rigidly held during its transverse movement, a cam adapted to lift the finger when the blank is presented over the second die, and transferring devices also carried by said slide and adapted to move a blank from the second die to the third and to discharge the completed buckle from the third die substantially as described.

4. In a buckle-machine, the combination with the bed having three dies arranged thereon, of a gate carrying three upper dies corresponding in location to the lower die, a slide transversely movable across the machine and carrying transferring devices for moving the blanks from one die to the next and discharging the completed buckle from the machine, of two switch-plates arranged one above the other, and two of the transferring devices arranged with projections adapted to coöperate with said switch-plates to raise the transferring devices for their return movement, substantially as described.

In testimony whereof I have signed this specification in the presence of two subscribing witnesses.

THEODORE P. HARTSHORN.

Witnesses:
K. GERTRUDE JOHNSON,
GEORGE H. THOMAS.